United States Patent [19]
Suzuki et al.

[11] Patent Number: 5,796,429
[45] Date of Patent: Aug. 18, 1998

[54] APPARATUS FOR RECORDING A VIDEO SIGNAL TOGETHER WITH INFORMATION FROM AN EXTERNAL STORAGE DEVICE

[75] Inventors: Koichiro Suzuki; Teruo Hieda; Koji Takahashi, all of Kanagawa-ken, Japan

[73] Assignee: Canon Kabushiki Kaisha, Tokyo, Japan

[21] Appl. No.: 449,567

[22] Filed: May 24, 1995

Related U.S. Application Data

[63] Continuation of Ser. No. 135,951, Oct. 13, 1993, abandoned, which is a continuation of Ser. No. 757,244, Sep. 10, 1991, abandoned.

[30] Foreign Application Priority Data

Sep. 18, 1990 [JP] Japan ..................... 2-249630

[51] Int. Cl.[6] .................................................. H04N 5/225
[52] U.S. Cl. ...................... 348/239; 348/232; 348/233
[58] Field of Search ................................. 348/207, 231, 348/232, 233, 239, 220; 358/335, 341; 395/352, 353, 354; 355/89; H04N 5/225

[56] References Cited

U.S. PATENT DOCUMENTS

| | | | |
|---|---|---|---|
| 4,999,709 | 3/1991 | Yamazaki et al. | 358/160 |
| 5,124,814 | 6/1992 | Takahashi et al. | 358/335 |
| 5,170,253 | 12/1992 | Horiuchi et al. | 348/239 |
| 5,515,101 | 5/1996 | Yoshida | 348/239 |

FOREIGN PATENT DOCUMENTS

| | | | |
|---|---|---|---|
| 62-18176 | 1/1987 | Japan | H04N 5/225 |
| 62-32778 | 2/1987 | Japan | H04N 5/225 |
| 2-224472 | 9/1990 | Japan | H04N 5/225 |
| 2-249371 | 10/1990 | Japan | H04N 5/225 |

*Primary Examiner*—Thai Tran
*Assistant Examiner*—Tuan V. Ho
*Attorney, Agent, or Firm*—Robin, Blecker & Daley

[57] ABSTRACT

A video signal recording apparatus selectively reads information stored in a plurality of external storage devices through a plurality of connecting parts and records the read information together with a video signal on a recording medium. A video camera selectively reads information stored in a plurality of external storage devices through a plurality of connecting parts and simultaneously records the read information and a video signal according to subject light on a recording medium. In accordance with the video signal recording apparatus and the video camera, a variety of video signals can be recorded and a variety of photography can be performed.

44 Claims, 11 Drawing Sheets

FIG.2(C)

| FILE NUMBER | NUMBER OF ITEMS | ITEM NUMBER | LEADING ADDRESS OF GRAPHIC DATA | MENU BIT MAP |
|---|---|---|---|---|
| MENU 1 | 4 | 1 | AD-1 | BM-1 |
| | | 2 | AD-2 | BM-2 |
| | | 3 | AD-3 | BM-3 |
| | | 4 | AD-4 | BM-4 |
| MENU 2 | 4 | 5 | AD-5 | BM-5 |
| | | 6 | AD-6 | BM-6 |
| | | 7 | AD-7 | BM-7 |
| | | 8 | AD-8 | BM-8 |
| MENU 3 | 2 | 9 | AD-9 | BM-9 |
| | | 10 | AD-10 | BM-10 |
| | | — | — | — |
| | | — | — | — |

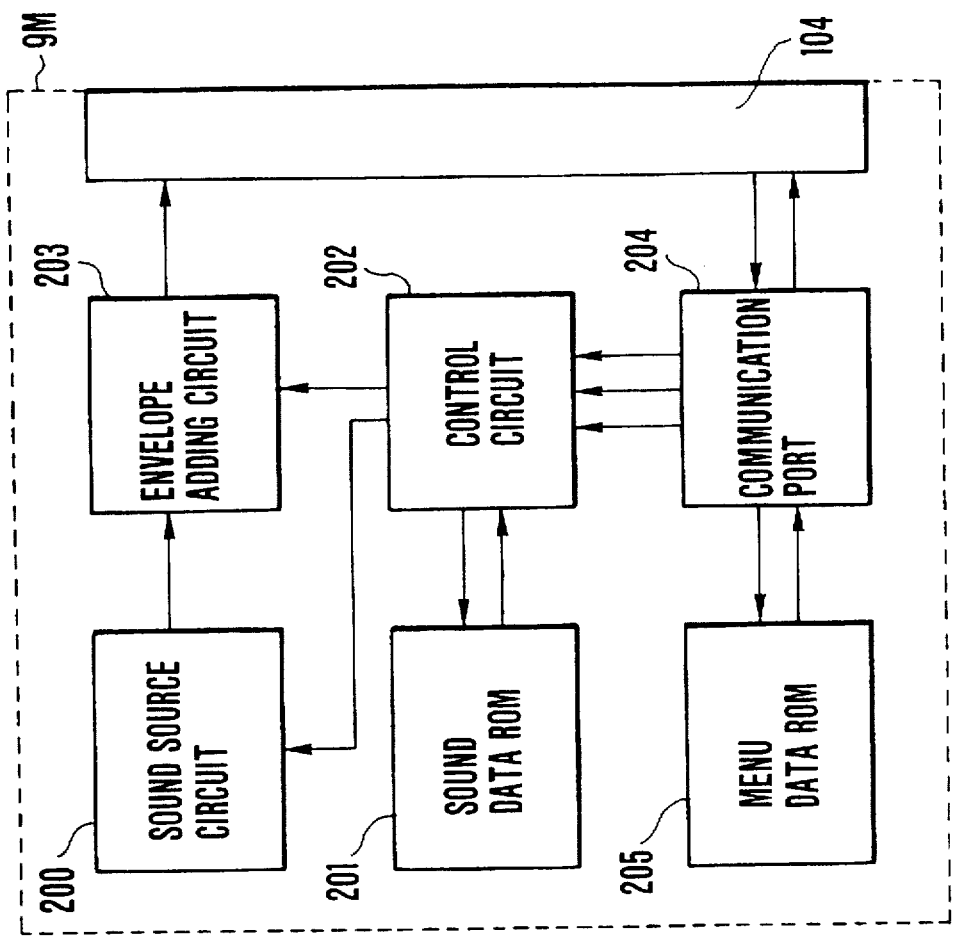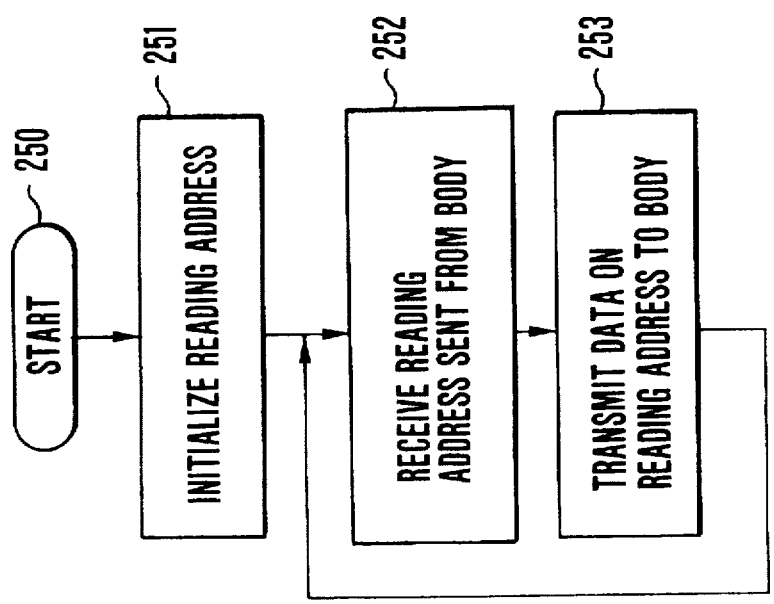

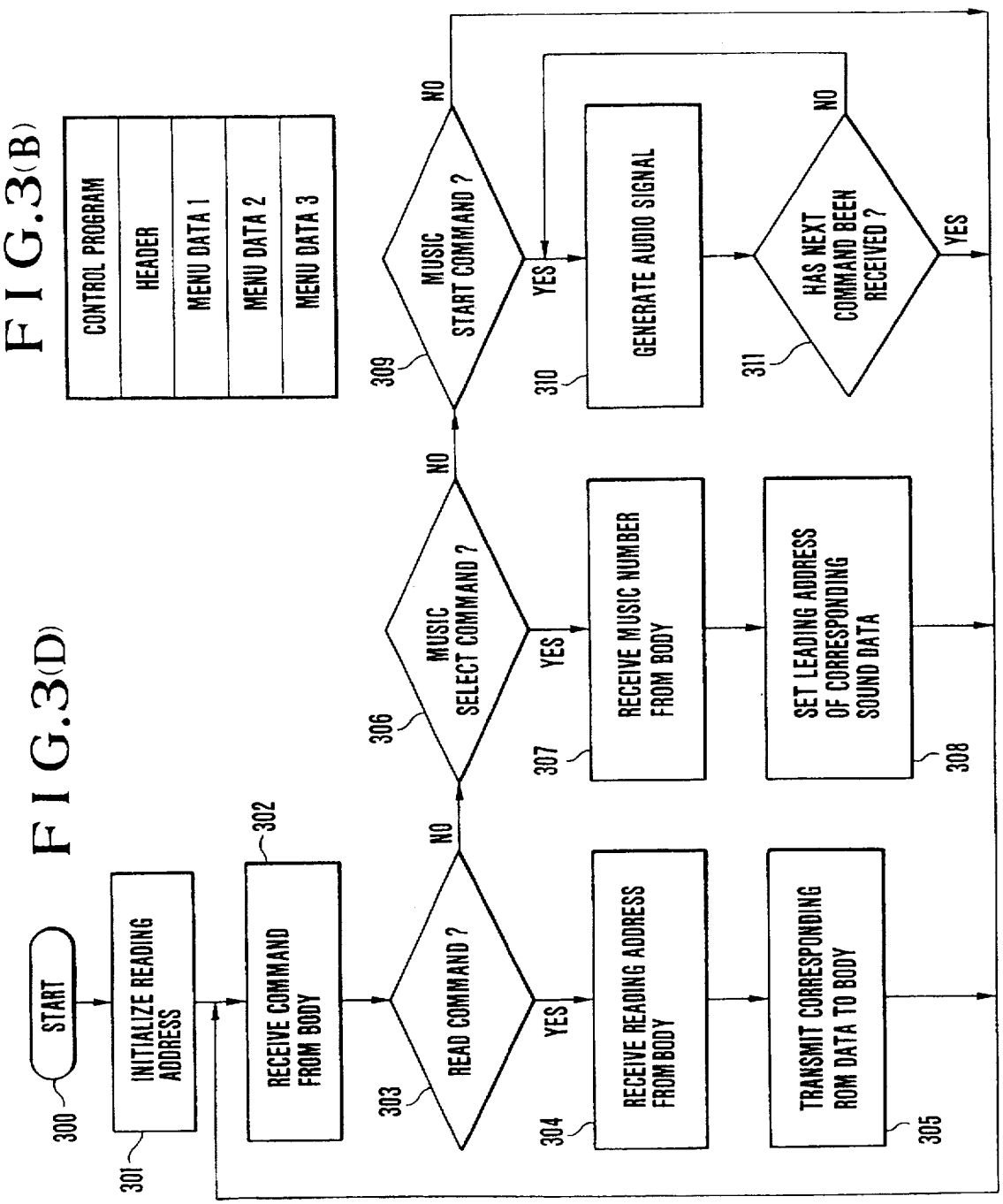

FIG.3(C)

| FILE NUMBER | NUMBER OF ITEMS | ITEM NUMBER | LEADING ADDRESS OF SOUND DATA | MENU CHARACTER CODE |
|---|---|---|---|---|
| MENU 1 | 4 | 1 | AD-1 | MC-1 |
| | | 2 | AD-2 | MC-2 |
| | | 3 | AD-3 | MC-3 |
| | | 4 | AD-4 | MC-4 |
| MENU 2 | 4 | 5 | AD-5 | MC-5 |
| | | 6 | AD-6 | MC-6 |
| | | 7 | AD-7 | MC-7 |
| | | 8 | AD-8 | MC-8 |
| MENU 3 | 2 | 9 | AD-9 | MC-9 |
| | | 10 | AD-10 | MC-10 |
| | | — | — | — |
| | | — | — | — |

FIG.4(A)

TITLE A

→ 1: NEW YEAR
   2: CALENDRICAL BEGINNING OF SPRING
   3: DOLL'S FESTIVAL
   4: ENTRANCE CEREMONY

FIG.4(B)

TITLE A

→ 5: CHILDREN'S DAY
   6: BEGINNING OF THE RAINY SEASON
   7: SEVENTH DAY OF THE SEVENTH MONTH OF THE LUNAR CALENDAR
   8: SUMMER VACATION

FIG.4(C)

TITLE A

→   9: SPORTS MEETING
   10: CHRISTMAS

FIG.4(D)

TITLE B
→ 1. NEW YEAR
2. VALENTINE DAY
3. EASTER SUNDAY
4. MOTHER'S DAY

FIG.4(E)

TITLE B
→ 5. FATHER'S DAY
6. INDEPENDENCE DAY
7. LABOR DAY
8. THANKSGIVING DAY

FIG.4(F)

TITLE B
→ 9. CHANUKAH
10. CHRISTMAS

APPARATUS FOR RECORDING A VIDEO SIGNAL TOGETHER WITH INFORMATION FROM AN EXTERNAL STORAGE DEVICE

This is a continuation of application under 37 CFR 1.62 of prior application Ser. No. 08/135,951, filed on Oct. 13, 1993 (abandoned) which is a continuation of application Ser. No. 07/757,244, filed on Sep. 10, 1991 (abandoned).

BACKGROUND OF THE INVENTION

1. Field of the Invention

The present invention relates to a video signal recording apparatus and a video camera and, more particularly, to a video signal recording apparatus provided with a removably attachable external storage device and to a video camera provided therewith.

2. Description of the Related Art

Numerous proposals have conventionally been made with respect to a system for combining, as by superimposition, an image such as a character, a symbol or a specific graphic image with a video signal to be recorded for the purposes of enhancing image effects or for superposing background music or sound effect on an audio signal to be recorded, when the video signal obtained by photography using a video camera or the audio signal recorded simultaneously with the photography is to be recorded.

One method of combining a different image signal with a video signal obtained by photography makes use of, for example, a so-called character generator.

This method utilizes an arrangement consisting of a pattern ROM (read-only memory) which stores patterns such as characters and symbols to be displayed, a register which stores the kind of character to be displayed at each display position, and a reading part for reading the contents of the pattern ROM that correspond to the contents of the register and for combining the read contents with a video signal, in accordance with horizontal and vertical sync signals.

When a character is to be displayed, the kind of character to be displayed is written into a register for a desired display position by a microcomputer or the like.

Another method is to convert a signal obtained by an imaging operation into a digital signal of the order of one to several bits by an A/D converter, store the digital signal in a memory for each display pixel, sequentially read the contents of the memory in accordance with horizontal and vertical sync signals, and combine the read contents with a video signal separately obtained by an imaging operation.

Another method is also proposed which utilizes an arrangement consisting of a graphic memory which corresponds to individual pixel positions on a picture, a microcomputer for writing data to be displayed into the graphic memory, and a reading circuit for reading the contents of the graphic memory. In this method, the contents of the graphic memory are read in accordance with horizontal and vertical sync signals, and the read contents are combined with a video signal obtained by photography.

A method of inserting a different audio signal into an audio signal recorded simultaneously with photography is to prepare means for generating an audio signal, such as a record disc, a music tape or an electronic sound generator, and to combine, as by a mixing amplifier, the audio signal generated from such means with an audio signal recorded on a tape simultaneously with photography while the audio signal is being reproduced from the tape.

However, there is the disadvantage that, as described above, the image combining device needed when a predetermined image signal is to be combined with a video signal obtained by photography is different from the sound combining device needed when a different audio signal is to be combined with a recorded audio signal. In addition, a number of connecting wires are needed for connecting those devices.

For one who is not familiar with the above-described image or sound processing, it is very difficult to carry out the above-described image or sound editing.

SUMMARY OF THE INVENTION

It is, therefore, an object of the present invention to solve the above-described problems.

It is another object of the present invention to provide a video signal recording apparatus capable of recording various kinds of information together with video signals.

To achieve the above objects, in accordance with one aspect of the present invention, there is provided a video signal recording apparatus which comprises a plurality of connecting parts to which a plurality of external storage devices are respectively removably attachable, reading means for selectively reading information stored in the plurality of external storage devices through the respective connecting parts, and recording means for recording the information read by the reading means together with a video signal on a recording medium.

It is still another object of the present invention to provide a video camera capable of providing various image displays corresponding to various kinds of external storage devices.

To achieve the above object, in accordance with another aspect of the present invention, there is provided a video camera which comprises image sensing means for forming a video signal according to subject light, a connecting part to which is removably attachable an external storage device which stores a first kind of image information or a second kind of image information, reading means for reading through the connecting part the first kind of image information or the second kind of information which is stored in the external storage device, first forming means for forming a first image signal from the first kind of image information read by the reading means, second forming means for forming a second image signal from the second kind of image information read by the reading means, and outputting means for simultaneously outputting the first image signal and the video signal supplied from the image sensing means.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 2(C) is a table showing in detail the menu data shown in FIG. 2(B);

FIG. 2(D) is a flowchart showing the operation of the microcomputer shown in FIG. 2(A);

FIG. 3(A) is a block diagram schematically showing the construction of an external storage device which stores music data;

FIG. 3(B) is a view showing the data stored in the ROM shown in FIG. 3(A);

FIG. 3(C) is a table showing in detail the menu data shown in FIG. 3(B);

FIG. 3(D) is a flowchart showing the operation of the control circuit shown in FIG. 3(A);

FIGS. 4(A) to 4(F) are views respectively showing selection menu displays provided in an EVF;

DETAILED DESCRIPTION OF THE PREFERRED EMBODIMENT

A preferred embodiment of the present invention will be described below in detail with reference to FIGS. 1 through 6.

A video camera according to the preferred embodiment of the present invention is arranged to selectively read data from two external storage devices removably attached to a camera body, convert the read data into an image or audio signal, and record the image or audio signal together with a television signal on a recording medium such as a magnetic tape. The video camera is provided with a character generator and an image generating part for data conversion corresponding to the kind of data stored in such external storage devices.

The video camera is also arranged to change the sequence of selection of data stored in two attached external storage devices in accordance with whether the kinds of main information stored in these external storage devices are different or the same, that is, in accordance with whether either of graphic data and music data is stored in both external storage devices or graphic data is stored in one of the external storage devices and music data in the other.

Figure 1:
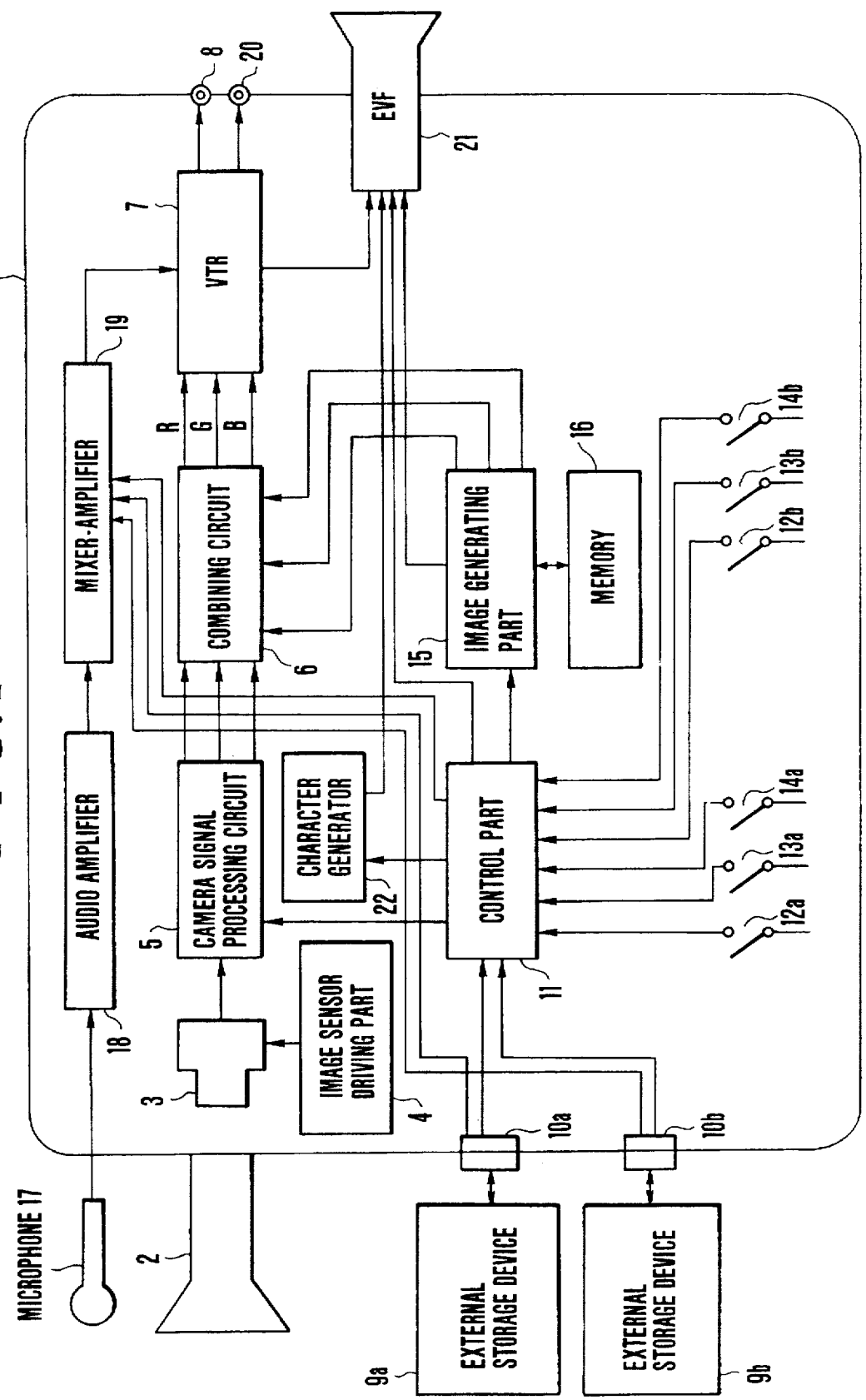
FIG. 1 is a block diagram diagrammatically showing the construction of a video camera according to an embodiment of the present invention and that of a system using such a video camera.

FIG. 1 is a block diagram diagrammatically showing the construction of a video camera according to the embodiment of the present invention and that of a system using such a video camera.

The arrangement shown in FIG. 1 includes a VTR-integrated type of video camera body 1, an imaging lens 2, an image sensor 3, an image sensor driving part 4, a camera signal processing circuit 5, a combining circuit 6 for combining a video signal with a title signal, a VTR part 7, an output terminal 8 for a video signal, external storage devices 9a and 9b, such as IC cards, which are removably attachable to the video camera body 1, a connecting part 10a disposed in a slot for providing connection between the external storage device 9a and the body 1, a connecting part 10b disposed in a slot for providing connection between the external storage device 9b and the body 1, a control part 11 for executing control of the external storage device 9a or 9b, transmission or reception of data, control of a mixer-amplifier 19, control of switches, control of a character generator 22, and so on, a title menu switch 12a, a music menu switch 12b, a title selecting switch 13a, a music selecting switch 13b, a title starting switch 14a, a music starting switch 14b, an image generating part 15 for generating a title image signal, a read/write memory 16 for holding image data from among data supplied from the external storage device 9a or 9b, a microphone 17 attached to a part of the body 1 for recording sound, an audio amplifier 18, a mixer-amplifier 19 for combining, according to a control signal from the control part 11, the output of the audio amplifier 18 with an audio signal supplied from the external storage device 9a or 9b, an audio output terminal 20, an electronic viewfinder (hereinafter referred to as an "EVF") 21 for displaying an image during recording or reproduction or character information indicative of the state of operation, and the character generator 22.

The following explanation is made on the assumption that each of the external storage devices 9a and 9b stores one kind of data selected from among different kinds of data such as graphic data and music data and also that each kind of data consists of different kinds of data such as code data and dot data.

A subject image (not shown) is formed on the image sensor 3 by the imaging lens 2, photoelectrically converted into an image signal by the image sensor 3, and supplied to the camera signal processing circuit 5.

The image sensor 3 performs a predetermined imaging operation in accordance with a timing pulse outputted from the image sensor driving part 4.

The camera signal processing circuit 5 applies predetermined processing to the image signal and outputs a video signal to the combining circuit 6. The combining circuit 6 combines the video signal with a title image signal which will be described later, and the combined signal is recorded in the VTR part 7.

During reproduction, the VTR part 7 is connected to an external device such as a television monitor through the output terminal 8 so that a reproduced signal is outputted.

In the meantime, sound collected by the microphone 17 is amplified by the audio amplifier 18, and is then combined with an audio signal generated from the external storage device 9b which will be described later, by the mixer-amplifier 19.

The combined audio signal is recorded together with the aforesaid video signal on a predetermined audio track or in a predetermined audio recording band in the VTR part 7.

The control part 11 transmits data to the image generating part 15, controls the image generating part 15, displays information such as a character in the EVF 21 by controlling the character generator 22, and so on, in accordance with the states of the respective switches 12a, 12b, 13a, 13b, 14a and 14b, the state of connection of the external storage device 9a or 9b connected to the connecting part 10a or 10b, data communicated from the external storage device 9a or 9b, and so on.

The image generating part 15 writes into the memory 16 the data inputted from the external storage device 9a by the control part 11. Also, the image generating part 15 reads data from the memory 16 to generate a title image signal, according to a command supplied from the control part 11. In the combining circuit 6, the title image signal is combined with the video signal as described previously.

Either of the external storage devices 9a and 9b is selectively removably attachable to each of the connecting parts 10a and 10b.

Figure 2B:
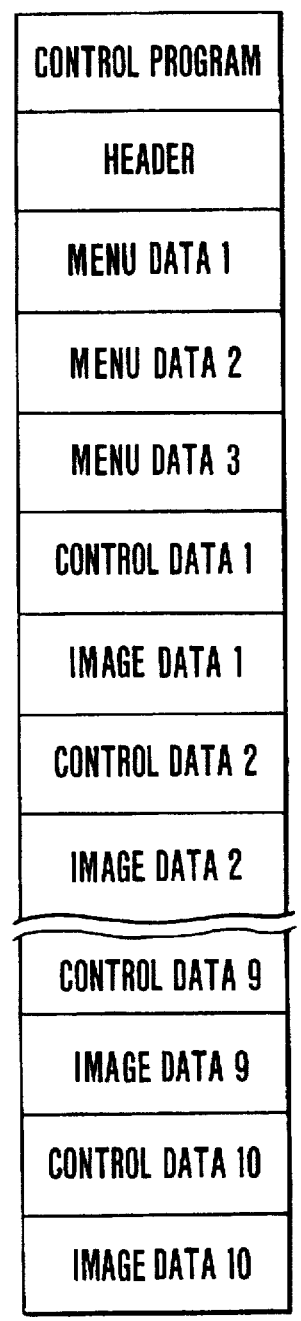
FIG. 2(B) is a partially omitted, schematic view showing data stored in the ROM shown in FIG. 2(A)
Figure 2A:
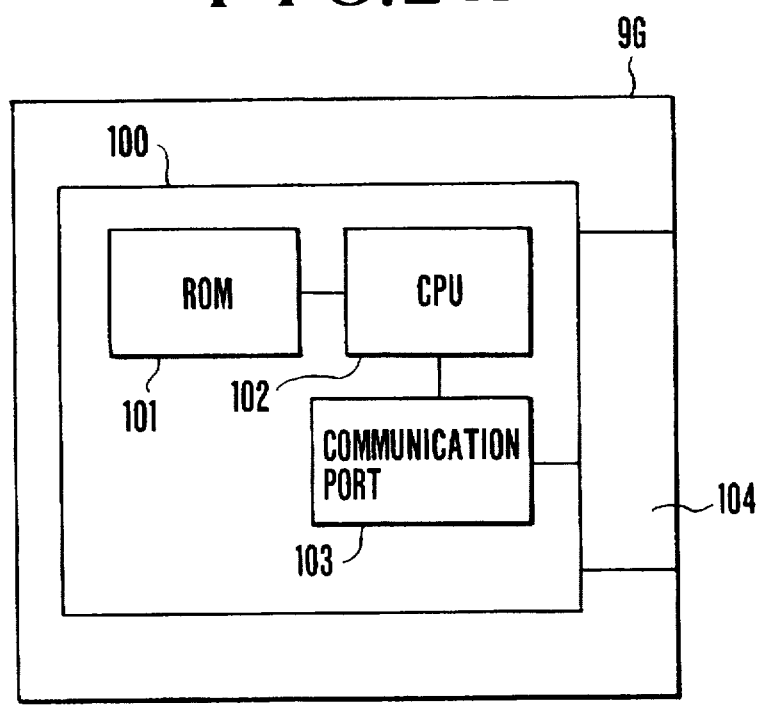
FIG. 2(A) is a schematic view showing the construction of an external storage device which stores graphic data.

FIG. 2(A) is a schematic view showing the construction of a first kind of external storage device 9G which stores graphic data.

The external storage device 9G shown in FIG. 2(A) includes a microcomputer 100, a ROM 101, a CPU 102, a serial communication port 103, and a connector 104 for providing electrical connection with the body 1. The ROM 101, the CPU 102 and the serial communication port 103 are incorporated in the CPU 100.

In the above-described arrangement, when a command is transmitted from the body 1 through the connector 104 and the communication port 103, the CPU 102 performs an operation according to the command, for example, reading data from the ROM 101 and transmitting it to the body 1 through the communication port 103 and the connector 104.

FIG. 2(B) is a view showing the data stored in the ROM 101 shown in FIG. 2(A).

As shown in FIG. 2(B), a control program for carrying out the aforesaid communication, interpretation of commands, reading of data, and so on, is stored at a leading part in the ROM 101. The control program is followed by a header part which contains data such as the kind of external storage device, the number of titles stored therein and the leading address of each stored data. The header part is followed by menu data 1 corresponding to titles 1 to 4, menu data 2 corresponding to titles 5 to 8, menu data 3 corresponding to titles 9 and 10, control data 1 and image data 1 corresponding to the title 1, . . . and control data 10 and image data 10 corresponding to the title 10. These data are stored at respective addresses as shown in FIG. 2(B).

FIG. 2(C) is a table showing in detail the menu data stored in the ROM 101 and, as shown, menu files for the number of menu pictures are prepared.

Each of the menu files includes the number of items in an associated menu, the serial number of each item, the leading address of control data corresponding to each item and image data for the menu.

The aforesaid image data is stored as bit-map data (dot data) or code data.

FIG. 2(D) is a flowchart showing the operation of the microcomputer 100 in the external storage device 9G.

After the process has been started in Step 250, a reading address is moved to the leading address of the header part in Step 251. Then, in Step 252, a reading address transmitted from the body 1 is received and, in Step 253, data on the reading address is transmitted to the body 1. The process returns to Step 252 and the above-described operation is repeated.

FIG. 3(A) is a block diagram schematically showing the construction of a second kind of external storage device 9M which stores music data. The external storage device 9M includes a sound source circuit 200, a sound data ROM 201, a control circuit 202, an envelope adding circuit 203, a communication port 204 and a menu data ROM 205.

In the above-described arrangement, if a command is sent from the body 1 to the control circuit 202 through the connector 104 and the communication port 204, the control circuit 202 carries out an operation corresponding to the command, e.g., the operation of reading data from the menu data ROM 205 and transmitting it to the body 1 through the communication port 204 and the connector 104, and the operation of generating a predetermined audio signal representative of music or sound effect by controlling the sound intervals and sound length of the sound source circuit 200 and the envelope adding circuit 203 in accordance with the contents of the sound data ROM 201 and outputting the predetermined audio signal to the body 1 through the connector 104.

FIG. 3(B) is a view showing the data stored in the menu data ROM 205 of FIG. 3(A). As shown, a control program for carrying out the aforesaid communication, interpretation of commands, reading of data, control of the sound source circuit 200, control of the envelope adding circuit 203, and so on, is stored at a leading part in the menu data ROM 205. The control program is followed by a header part which contains data such as the kind of external storage device, the number of music items stored therein and the leading address of each stored data. The header part is followed by menu data 1 corresponding to music items 1 to 4, menu data 2 corresponding to music items 5 to 8, and menu data 3 corresponding to music items 9 and 10, all of which are stored at respective addresses as shown in FIG. 3(B).

FIG. 3(C) is a table showing in detail the menu data stored in the ROM 205 and, as shown, menu files for the number of menu pictures are prepared.

Each of the menu files includes the number of items in an associated menu, the serial number of each item, the leading address of sound control data in the sound data ROM 201 that corresponds to each item, and character data for the menu.

FIG. 3(D) is a flowchart showing the operation of the control circuit 202 in the external storage device 9M.

After the process has been started in Step 300, a reading address is moved to the leading address of the header within the menu data ROM 205 in Step 301, and is used for a kind-identifying operation in the body 1 as will be described later.

Subsequently, when a command is received from the body 1 in Step 302, it is determined in Step 303 whether a read command has been received. In the case of the read command, the process proceeds to Step 304, where a reading address is received from the body 1. In Step 305, data corresponding to the reading address is read from the menu data ROM 205 and transmitted to the body 1. Then, the process returns to Step 302. If the received command is not a read command, the process proceeds to Step 306.

In Step 306, it is determined whether the received command is a music select command. In the case of the music select command, the number of a music item is received from the body 1 in Step 307 and, in Step 308, the leading address of sound data corresponding to the number of music specified by the body 1 is determined in the menu data ROM 205. Then, the process returns to Step 302. If the received command is not a music select command, the process proceeds to Step 309.

In Step 309, it is determined whether the received command is a music start command. In the case of the music start command, the process proceeds to step 310, where a predetermined audio signal such as music or sound effect is generated by controlling the sound intervals and sound length of the sound source circuit 200 and the envelope adding circuit 203 according to the specified contents of the sound data ROM 201, and the predetermined audio signal is outputted to the body 1 through the connector 104. The process returns to Step 310 and the above-described audio signal generation is continued until the next command is received in Step 311. If the received command is not a music start command, the process returns to Step 302 and the above-described operation is repeated.

FIGS. 4(A) to 4(F) show different selection menu displays provided in the EVF 21 when the title selecting switch 13a is operated with two external storage devices each storing graphic data being connected to the respective connecting parts 10a and 10b.

FIG. 4(A) shows the initial picture of a title selecting menu in which "TITLE" is displayed at the top of the title selecting menu to indicate that a desired title is being selected and the names of the respective titles 1 to 4 are displayed below "TITLE". The titles 1 to 4 are contained in the title menu data 1 stored in the ROM 101 disposed in the microcomputer 100 in the external storage device connected to the connecting part 10a.

FIG. 4(B) shows a picture which is displayed when the title selecting switch 13a is operated in the state of FIG. 4(A). FIG. 4(B) shows that the names of the respective titles 5 to 8 contained in the title menu data 2 are displayed in a manner similar to the manner of FIG. 4(A).

FIG. 4(C) shows a picture which is displayed when the title selecting switch 13a is further operated in the state of FIG. 4(B). FIG. 4(C) shows that the names of the respective titles 9 and 10 contained in the title menu data 3 are displayed.

FIG. 4(D) shows a picture which is displayed when the title selecting switch 13a is further operated in the state of FIG. 4(C). FIG. 4(D) shows that the names of the respective titles 1 to 4 are displayed in a manner similar to the manner of FIG. 4(A), which are contained in the title menu data 1 stored in the ROM 101 disposed in the microcomputer 100 in the external storage device connected to the connecting part 10b.

FIG. 4(E) shows a picture which is displayed when the title selecting switch 13a is further operated in the state of FIG. 4(D). FIG. 4(E) shows that the names of the respective titles 5 to 8 contained in the title menu data 2 are displayed.

FIG. 4(F) shows a picture which is displayed when the title selecting switch 13a is further operated in the state of FIG. 4(E). FIG. 4(F) shows that the names of the respective titles 9 and 10 contained in the title menu data 3 are displayed.

As described above, in the present embodiment, if the external storage devices of the same kind are connected to the respective connecting parts 10a and 10b, the names of the titles in each of the external storage devices are sequentially outputted in accordance with the operation of the title selecting switch corresponding to the kind of the connected external storage devices.

If different kinds of external storage devices are connected to the respective connecting parts 10a and 10b, menu picture data is outputted from only the external storage device corresponding to the title selecting switch 13a or 13b in accordance with the operation of the title selecting switch 13a or 13b.

Figure 5A:
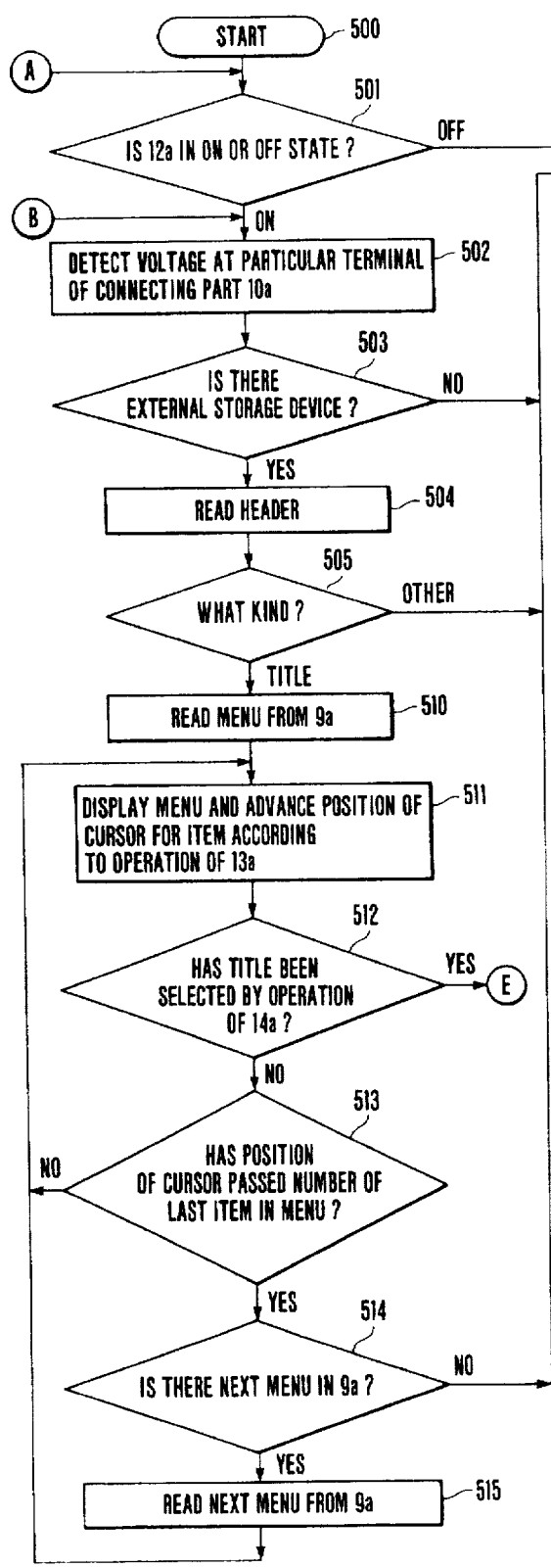
FIGS. 5(A) to 5(D) are flowcharts showing the operation of the control part shown in FIG. 1.
Figure 5A:
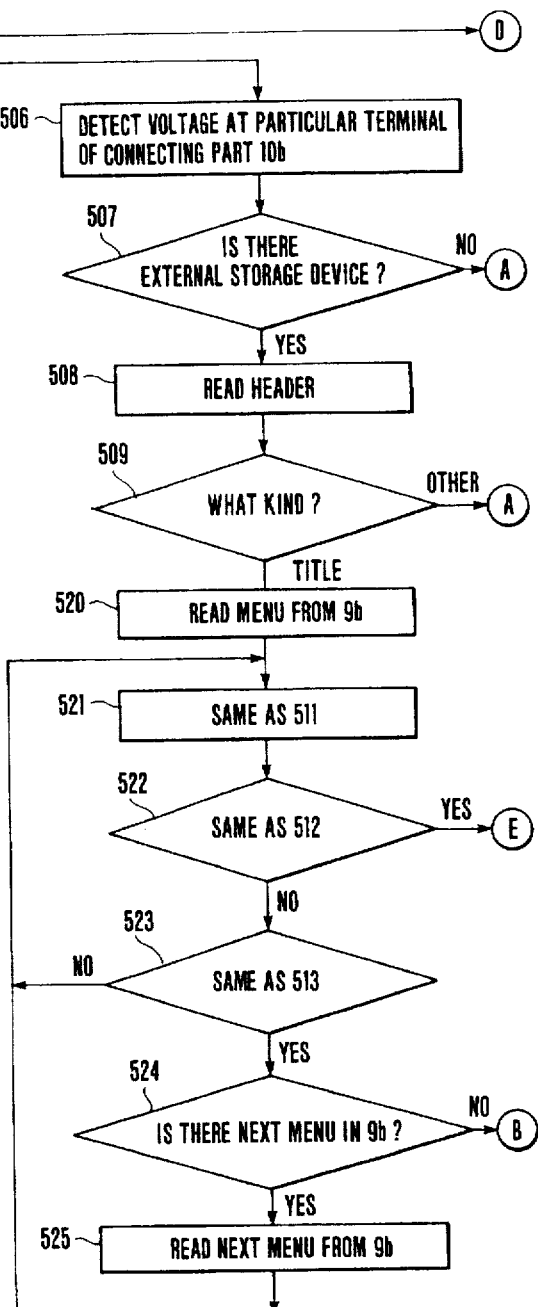

FIGS. 5(A) to 5(D) are flowcharts showing the operation of the control part 11 shown in FIG. 1, and the process starts in Step 500 (FIG. 5(A)).

The state of the title menu switch 12a is identified in Step 501. If the title menu switch 12a is off, the process proceeds to Step 551 (FIG. 5(B)), while if it is on, the process proceeds to Step 502. In Step 502, whether the external storage device 9a is connected to the connecting part 10a is detected by checking a voltage at a particular terminal of the connecting part 10a. In Step 503, if the external storage device 9a is not connected to the connecting part 10a, the process proceeds to step 506, while if it is connected to the connecting part 10a, the process proceeds to Step 504. In Step 504, data is read on the kind of connected external storage device which is contained in the header part. In Step 505, the kind of connected external storage device is identified. In the case of the external storage device 9G which stores graphic data, the process proceeds to Step 510; otherwise, the process proceeds to Step 506.

In Step 506, whether the external storage device 9b is connected to the connecting part 10b is detected in a manner similar to that executed in Step 502. If it is determined in Step 507 that the external storage device 9b is not connected to the connecting part 10b, the process returns to Step 501; otherwise, the process proceeds to Step 508. In Step 508, data contained in the header part is read similarly to Step 504. In Step 509, the kind of connected external storage device is identified. In the case of the external storage device 9G which stores graphic data, the process proceeds to Step 520; otherwise, the process returns to Step 501.

Figure 5B:
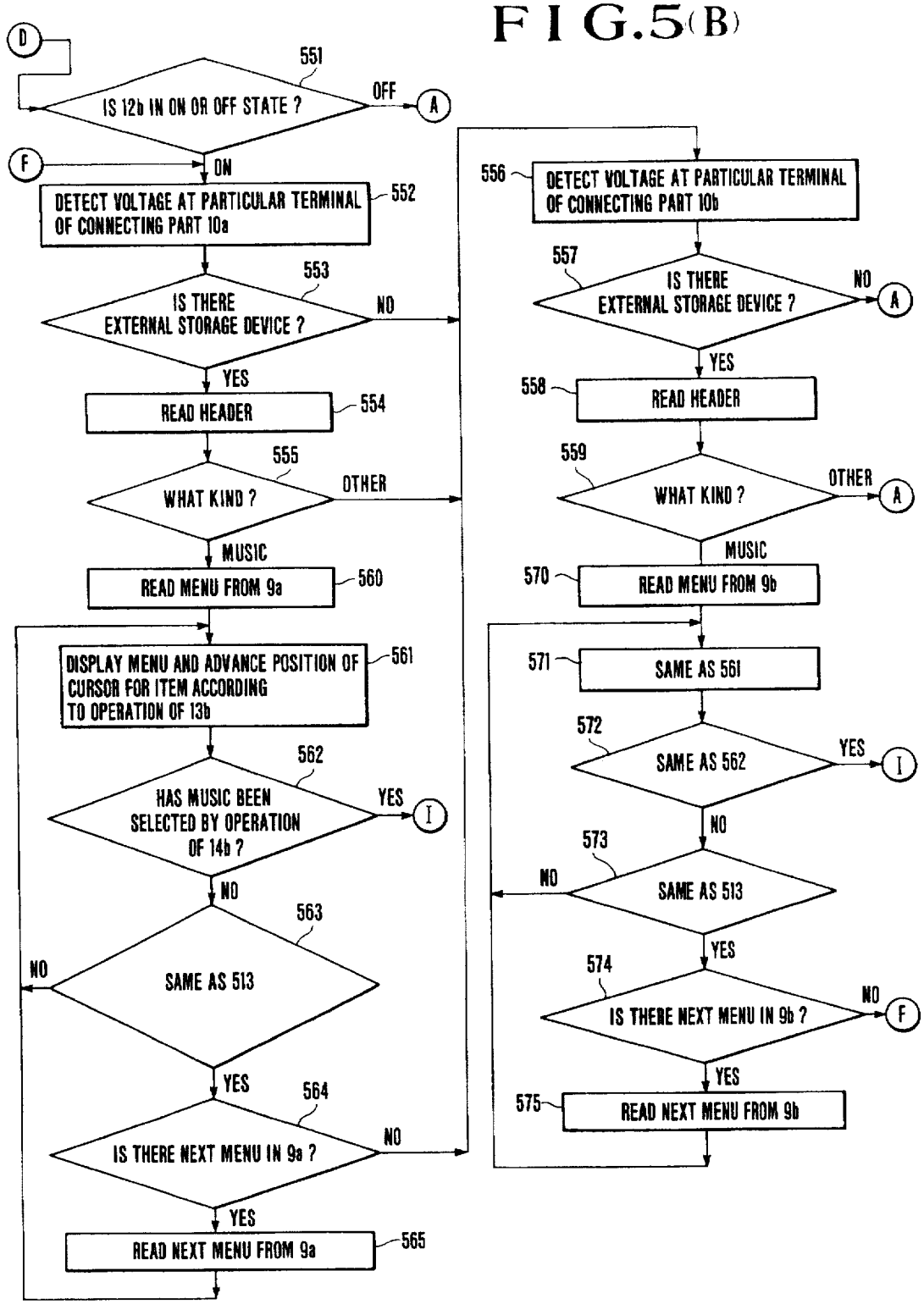

In the meantime, the state of the music menu switch 12b is identified in Step 551 (FIG. 5(B)). If the music menu switch 12b is off, the process proceeds to Step 501, while if it is on, the process proceeds to Step 552. In Step 552, whether the external storage device 9a is connected to the connecting part 10a is detected in a manner similar to that executed in Step 502. In Step 553, if the external storage device 9a is not connected to the connecting part 10a, the process proceeds to step 556, while if it is connected to the connecting part 10a, the process proceeds to Step 554. In Step 554, data is read on the kind of connected external storage device which is contained in the header part. In Step 555, the kind of connected external storage device is identified. In the case of the external storage device 9M which stores music data, the process proceeds to Step 560; otherwise, the process proceeds to Step 556.

In Step 556, whether the external storage device 9b is connected to the connecting part 10b is detected in a manner similar to that executed in Step 506. If it is determined in Step 557 that the external storage device 9b is not connected to the connecting part 10b, the process returns to Step 501; otherwise, the process proceeds to Step 558. In Step 558, data contained in the header part is read similarly to Step 504. In Step 559, the kind of connected external storage device is identified. In the case of the external storage device 9M which stores music data, the process proceeds to Step 570; otherwise, the process returns to Step 501.

In Step 510, the menu data 1 is read from the external storage device 9a and, in Step 511, a display is provided as shown in FIG. 4(A) in accordance with the menu data 1 and the position of a cursor for selecting an item is advanced in accordance with the operation of the title selecting switch 13a. If the operation of the title start switch 14a is detected in Step 512, the process proceeds to Step 580 (FIG. 5(C)); otherwise, the process proceeds to Step 513.

If it is determined in Step 513 that the position of the cursor has not passed the number of the last item in the menu, the process returns to Step 511 and the above-described operation is repeated. Otherwise, the process proceeds to Step 514, where it is determined whether other menu data is stored in the external storage device 9a. If there is any menu data, the process proceeds to Step 515, where the menu data is read from the external storage device 9a. The process returns to Step 511, where the operation of providing a display as shown in FIG. 4(B) and then a display as shown in FIG. 4(C) is repeated in accordance with the menu data. If there is no menu data, the process proceeds to Step 506.

Processing for the connecting part 10b executed in Steps 520 to 525 of the flowchart is similar to the processing for the connecting part 10a executed in Steps 510 to 515 of the above-described flowchart. It is to be noted that if it is determined in Step 524 that there is no further menu data in the external storage device 9b, the process returns to Step 502, thereby forming a loop.

Processing for the external storage device 9M which stores music data, i.e., processing executed in Steps 552 to 575 of the flowchart, is similar to the processing for the external storage device 9G which stores graphic data, i.e., the processing executed in Steps 502 to 525 of the above-described flowchart. The title menu switch 12a, the title selecting switch 13a and the title starting switch 14a correspond to the music menu switch 12b, the music selecting switch 13b and the music starting switch 14b, respectively.

Figure 5C:
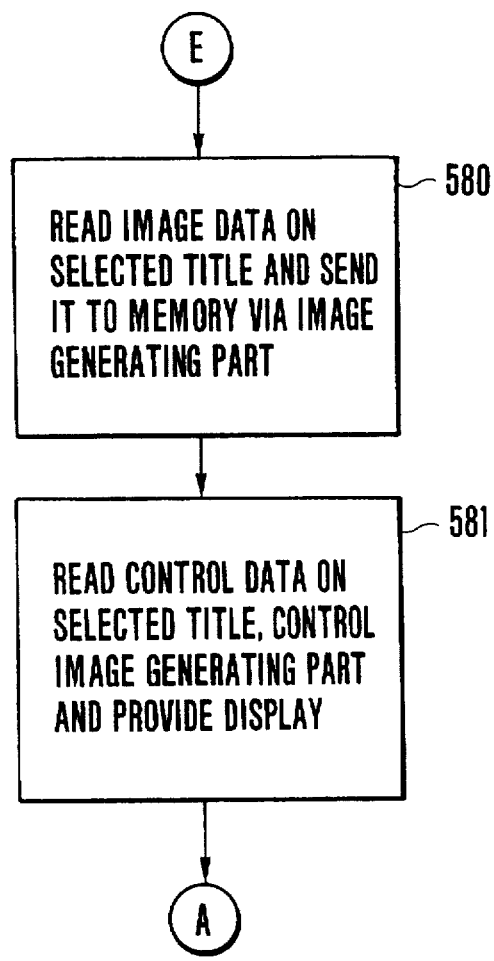

In Step 580 of FIG. 5(C), image data on a selected title is read from the external storage device 9G and is then written into the memory 16 through the image generating part 15. In Step 581, control data on the selected title is read from the external storage device 9G and the image generating part 15 is controlled in accordance with the read control data so that the operation of displaying the title is performed. Then, the process returns to Step 501, and the above-described operation is repeated.

Figure 5D:
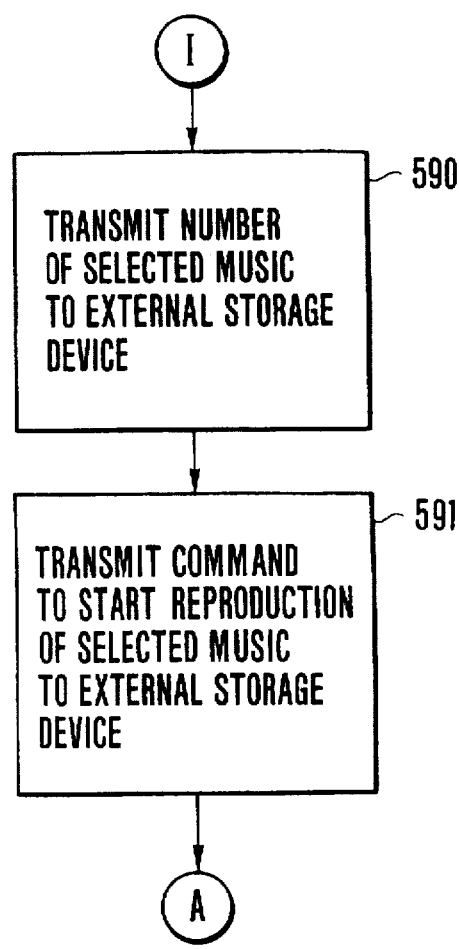

In Step 590 of FIG. 5(D), a music select command and the number of a selected music item are transmitted to the external storage device 9M. In Step 591, a music start command is transmitted to the external storage device 9M and a control signal for starting mixing is transmitted to the mixer-amplifier 19. Then, the process returns to Step 501 and the above-described operation is repeated.

In accordance with the above-described flowcharts, in a case where the external storage devices 9G are connected to the respective connecting parts 10a and 10b, if the title menu switch 12a is operated to start a menu-selecting operation, the menus of the two external storage devices 9G are sequentially displayed by the operation of the title selecting switch 13a so that a desired item can be selected through the title starting switch 14a.

In a case where the external storage device 9G is connected to either one of the respective connecting parts 10a and 10b, if the title menu switch 12a is operated to start a menu-selecting operation, the menus of the single external storage device 9G are sequentially displayed by the operation of the title selecting switch 13a so that a desired item can be selected through the title starting switch 14a.

In a case where the external storage device 9G is not connected to the connecting part 10a or 10b, even if the title menu switch 12a is operated, no menu-selecting operation is started.

Although the above explanation refers to the operation achieved by the combination of the external storage device 9G, the title menu switch 12a, the title selecting switch 13a and the title starting switch 14a, it is a matter of course that a similar operation is achieved by the combination of the external storage device 9M, the music menu switch 12b, the music selecting switch 13b and the music starting switch 14b.

Figure 6:
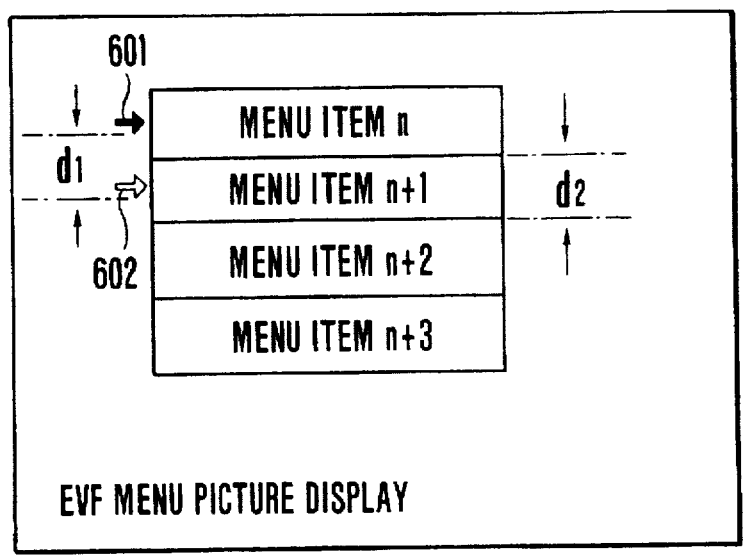
FIG. 6 is a schematic view showing a menu picture.

FIG. 6 is a view for explaining a menu picture.

In FIG. 6, a cursor is denoted by reference numeral 601, and the next position at which the cursor is to be displayed is denoted by reference numeral 602. Widths d1 and d2 are selected to be the same as each other.

The control part 11 identifies the contents of the menu data stored in the external storage device. If a character code is stored, the control part 11 reads it and controls the character generator 22 on the basis of the read data, thereby displaying associated characters and the cursor 601.

If image data is stored, the control part 11 takes out the image data and stores it into the memory 16 via the image generating part 15. The control part 11 gives a control command to the image generating part 15 and displays associated menu items, and displays the cursor 601 by controlling the character generator 22.

In the above-described operation, it is necessary to make the width d1 of movement of the cursor 601 coincident with the width d2 of the menu item.

By operating the title selecting switch 13a, the cursor 601 is made to indicate the next menu item.

In the above-described embodiment, since each menu picture is prepared for the number of items which can be displayed in the EVF at one time, it is not necessary to restrict the number of menu items to a specific number and it is possible to freely set the number of items to be displayed in each menu picture.

If the menu picture is composed of dot data, it is possible to represent menu items in the form of marks or icons as well as characters.

In addition, if each menu is formed of code data indicative of characters, the storage capacity required for menu data can be reduced.

The above-described embodiment is arranged so that an operator can perform selection from information supplied from the external storage device or devices while looking into the EVF of the video camera. Accordingly, it is not necessary to add a selecting display member to the video camera, whereby the size of the video camera can be reduced.

The image data in each external storage device is divided into dot data and code data, and the character generator 22 and the image generating part 15 are separately disposed for converting the respective data. Accordingly, it is possible to easily alter the contents displayed in the EVF by altering the contents of the character generator 22.

As is apparent from the foregoing description, since the apparatus according to the aforesaid embodiment is arranged in the above-described manner, various kinds of data can be obtained from the external storage devices and recorded on a magnetic tape or the like together with a television signal. Accordingly, it is possible to easily achieve various kinds of recording operations without substantially increasing the scale of the entire system.

In accordance with the above-described embodiment, it is possible to increase the degree of freedom of the connection relation between the external storage devices and the respective connecting parts owing to the arrangement in which an arbitrary external storage device can be connected to each of the connecting parts. Accordingly, it is also possible to achieve various kinds of recording operations by setting the manner of data selection according to each of the connection relations.

In addition, it is possible to effectively utilize the connecting parts owing to the arrangement in which various kinds of external storage devices can be connected to them.

Since different data converting means are provided in the recording apparatus, it is possible to change the manner of data storage in the external storage device. For example, in the case of a storage device which stores a large amount of data, it is possible to reduce the required storage capacity, e.g., by storing such data as code data. Accordingly, it is possible to reduce the storage capacity of the external storage device.

In addition, the image data in the external storage device is divided into dot data and character data, and data converting means are separately disposed for the respective data. Accordingly, it is possible to easily alter display contents by changing the data converting means.

What is claimed is:

1. A video signal recording apparatus, comprising:
   (a) connecting means to which an external storage device is attachable and detachable, said external storage device storing a plurality of image information and control information representing literal information, said control information relating to the plurality of image information;
   (b) reading means for reading the image information and the control information stored in the external storage device through said connecting means;
   (c) generation means for generating a first video signal representing the literal information according to the control information read by said reading means;
   (d) selecting means for selecting image information among the plurality of image information read by said reading means by using the first video signal generated by said generation means and forming a second video signal representing the selected image information; and
   (e) recording means for recording the second video signal generated by said selecting means together with a video signal on a recording medium.

2. An apparatus according to claim 1, further comprising image sensing means for forming the video signal from subject light.

3. An apparatus according to claim 1, wherein said recording means includes combining means for combining an image signal related to the image information selected by said selecting means with said video signal.

4. An apparatus according to claim 1, wherein said selecting means includes manual operating means for effecting said selecting operation.

5. An apparatus according to claim 1, further comprising display means for displaying image information selected by said selecting means.

6. An apparatus according to claim 5, wherein said image information for display relates to said image information for recording.

7. An apparatus according to claim 1, further comprising:
   detecting means for automatically detecting a kind of the plurality of kinds of external storage devices.

8. A video camera, comprising:
   (a) image sensing means for forming a video signal according to subject light;
   (b) connecting means to which an external storage device is attachable and detachable, said external storage device storing a plurality of image information and control information representing literal information, said control information relating to the plurality of image information;
   (c) reading means for reading the image information and the control information stored in the external storage device through said connecting means;
   (d) generation means for generating a first video signal representing the literal information according to the control information read by said reading means;
   (e) selecting means for selecting image information among the plurality of the image information read by said reading means by using the first video signal generated by said generating means and forming a second video signal representing the selected image information;
   (f) combining means for combining the second video signal generated by said selecting means and said video signal supplied from said image sensing means; and
   (g) outputting means for outputting said combined signal combined by said combining means.

9. A camera according to claim 8, wherein said selecting means includes manual operating means for selecting audio information among a plurality of kinds of a audio information.

10. A camera according to claim 8, further comprising display means for displaying the control information read by said reading means.

11. A video signal processing apparatus, comprising:
    (a) input means for inputting a main video signal;
    (b) connecting means to which an external storage device is attachable and detachable,
    the external storage device storing image information and literal information relative to the image information;
    (c) reading means for reading the image information and the literal information from the external storage device through said connecting means;
    (d) means for forming a first subordinate video signal according to the literal information read by said reading means;
    (e) selecting means for selecting image information among said image information read by said reading means by using said first subordinate signal;
    (f) means for forming a second subordinate video signal according to said image information selected by said selecting means; and
    (g) combining means for combining said second subordinate signal and said main video signal supplied from said image sensing means and outputting said combined signal.

12. A camera according to claim 11, wherein said literal information includes image data of dot data and image data of code data.

13. A camera according to claim 11, further comprising display means for displaying an image according to said first subordinate video signal.

14. A camera according to claim 13, wherein said display means is also able to display an image according to said second subordinate video signal.

15. An apparatus according to claim 11, further comprising
    recording means for recording an output of said combining means.

16. An apparatus according to claim 11, wherein said input means includes imaging means for generating the video signal according to subject light.

17. A video signal processing apparatus, comprising:
    (a) input means for inputting a main video signal;
    (b) connecting means to which an external storage device is attachable and detachable,
    the external storage device storing image information and literal information relative to the image information;
    (c) reading means for reading the image Information and the literal information from the external storage device through said connecting means;
    (d) means for forming a first subordinate video signal according to the literal information read by said reading means;
    (e) selecting means for selecting image information among said image information read by said reading means by using said first subordinate signal;
    (f) means for forming a second subordinate video signal according to said image information selected by said selecting means; and (g) displaying means for displaying together the second subordinate signal and the main video signal from said input means.

18. An apparatus according to claim 17, wherein said connecting means includes a plurality of connecting parts to which the mutually different kind of the external storage devices are connected.

19. An apparatus according to claim 17, wherein said input means includes a photo-taking part for photographing an object and outputting the main video signal.

20. An apparatus according to claim 17, comprising recording means for recording together the second subordinate signal and the main video signal from said input means.

21. An apparatus according to claim 17, wherein said selecting means includes a manual operating part for selecting the image information.

22. An image processing apparatus to which an external storage device is detachable and attachable, said external storage device storing a plurality of image information and control data representing literal information, said control data relating to the plurality of image information, said external storage device having a solid-state memory, said apparatus comprising:
reading means for reading the image information and the control data stored in said external storage device;
generation means for generating a first video signal representing the literal information according to the control data read by said reading means;
selection means for selecting image information among the image information stored in said external storage device by using the first video signal generated by said generation means and generating a second video signal representing the selected image information; and
output means for outputting the image information selected by said selection means.

23. An apparatus according to claim 22, wherein said output means outputs the second video signal to a display device.

24. An apparatus according to claim 22, further comprising image sensing means for generating a video signal according to an object light.

25. An apparatus according to claim 24, wherein said output means includes combining means for combining the second video signal and the video signal generated by said video signal generation means.

26. An apparatus according to claim 24, wherein a display device displays an image represented by the video signal generated by said video signal generation means.

27. An apparatus according to claim 24, wherein said output means includes recording means for recording the video signal supplied from said image sensing means.

28. An apparatus according to claim 22, wherein said output means outputs the second video signal to a recording device by which the second video signal is recorded on a recording medium.

29. An apparatus according to claim 22, wherein said control data being stored in said solid-state memory.

30. An apparatus according to claim 22, further comprising a connection part to which said external storage device is connected.

31. An apparatus according to claim 30, wherein said connection part has a terminal through which said control data are read by said reading means, and wherein said reading means includes a detection means for detecting said external storage device by detecting a voltage of the terminal.

32. An image processing apparatus to which an external storage device is detachable and attachable, said external storage device storing a plurality of image information and control data representing literal information, said control data relating to the plurality of image information, said external storage device having a solid-state memory, said apparatus comprising:
reading means for reading the image information and the control data stored in said external storage device;
generation means for generating a first video signal representing the literal information according to the control data read by said reading means;
display means for displaying the literal information according to the first video signal generated by said generation means;
determining means for manually determining literal information among the literal information displayed by said display means; and
control means for determining image information among the plurality of image information stored in said external storage device according to a determined result of said determining means and for generating a second video signal representing the determined image information.

33. An apparatus according to claim 32, wherein said determining means includes an operation member for manually determining the literal information.

34. An apparatus according to claim 32, wherein said control means outputs the second video signal to said display means, and wherein said display means displays the determined image information according to the second video signal.

35. An apparatus according to claim 32, further comprising image sensing means for generating a video signal according to an object light, wherein said display means displays an image represented by the video signal generated by said image sensing means.

36. An apparatus according to claim 35, further comprising recording means for recording the video signal generated by said image sensing means.

37. An apparatus according to claim 32, wherein said control means outputs the second video signal to a recording device by which the second video signal is recorded on a recording medium.

38. An apparatus according to claim 32, wherein control data being stored in said solid-state memory.

39. An apparatus according to claim 32, further comprising a connection part to which said external storage device is connected.

40. An apparatus according to claim 39, wherein said connection part has a terminal through which the control data are read by said reading means, and wherein said reading means includes a detection means for detecting said external storage device by detecting a voltage of the terminal.

41. An apparatus according to claim 32, wherein said external storage device includes an IC-card.

42. An image apparatus, comprising:
image sensing means for generating a video signal according to an object light;
storing means for storing a plurality of image information and control data representing a plurality of literal information, said control data relating to the plurality of image information;
reading means for reading the image information and the control data from said storing means;
generation means for generating a first video signal representing the plurality of literal information according to the control data read by said reading means;

selection means for selecting image information among the plurality of image information stored in said storing means by using the first video signal generated by said generation means and generating a second video signal representing the selected image information; and display means for displaying the selected image information represented by the second video signal and an image represented by said video signal generated by said image sensing means.

43. An apparatus according to claim 42, further comprising combining means for combining the second video signal and the video signal generated by said image sensing means, wherein said display means displaying an image represented by said combined signal.

44. An apparatus according to claim 42, further comprising recording means for recording the combined signal from said combining means on a recording medium.

* * * * *

UNITED STATES PATENT AND TRADEMARK OFFICE
CERTIFICATE OF CORRECTION

PATENT NO. : 5,796,429

DATED : August 18, 1998

INVENTOR(S) : Koichiro Suzuki, et al.

It is certified that error appears in the above-identified patent and that said Letters Patent is hereby corrected as shown below:

Col. 12, line 5, delete "a" (second occurrence)

Col. 12, line 56, delete "Information" and insert --information--.

Signed and Sealed this

Sixteenth Day of February, 1999

Attest:

Attesting Officer

Acting Commissioner of Patents and Trademarks